May 29, 1956 O. E. NORBERG ET AL 2,747,773

COFFEE PRESERVING AND DISPENSING APPARATUS

Filed Nov. 18, 1953 2 Sheets-Sheet 1

INVENTORS.
OSCAR E. NORBERG.
LEROY H. LAFLIN.
BY Alden D. Redfield
Warren Kunz.
ATTORNEYS.

INVENTORS.
OSCAR E. NORBERG.
LEROY H. LAFLIN.
BY Alden D. Redfield
Warren Kunz.
ATTORNEYS.

United States Patent Office 2,747,773
Patented May 29, 1956

2,747,773

COFFEE PRESERVING AND DISPENSING APPARATUS

Oscar E. Norberg and Le Roy H. Laflin, Cincinnati, Ohio, assignors to Avco Manufacturing Corporation, Cincinnati, Ohio, a corporation of Delaware Application November 18, 1953, Serial No. 392,819

3 Claims. (Cl. 222—190)

The present invention relates to an improved form of coffee dispenser and, more particularly, to such a dispenser designed for storage in a domestic refrigerator.

More specifically, the invention concerns a coffee dispenser designed to contain, preserve, dispense, and automatically measure coffee and similar products for household use.

Briefly stated, the invention comprises an upright housing with a removable lid for storing coffee. The housing defines a transverse partition against which is slidably retained a vertically movable plunger which cooperates with an opening in the partition for controlling flow of coffee to a measuring cavity beneath the plunger. As the plunger is depressed, it actuates a discharge valve for releasing a measured supply of coffee from the measuring cavity to a coffee pot or other utensil.

Tests indicate that the flavor and quality of coffee can be preserved over relatively long periods of time if the coffee is kept in a refrigerated dry atmosphere. Accordingly, the lid is designed to fit tightly on the housing to prevent ingress of air. There is also provided within the housing a desiccating unit for absorbing moisture from the air in direct contact with the coffee. This desiccating unit is removable so that it may be repeatedly rejuvenated to assure satisfactory service.

In view of the foregoing, it will be understood that a broad object of the present invention is to provide an improved form of coffee container and dispenser.

Another broad object of the present invention is to provide an improved appparatus which not only preserves the quality, flavor, and aroma of the coffee but also dispenses it and automatically measures it by simple manipulation of the parts of the apparatus.

A more specific object of the invention is the provision of an improved control and metering element for a coffee container and dispenser which is designed to prevent flow of coffee to a measuring cavity prior to discharge of the coffee therefrom. In other words, an important advantage of the present invention is the construction and arrangement of the control and metering element whereby continuous flow of coffee from the container through the measuring cavity to the place of use is prevented.

A still further object of the invention is the provision of an improved coffee container and dispenser which, although it is attractive and highly functional, is simple and economical to manufacture.

Another advantage of the invention is that the improved container and dispenser is easily dismantled for cleaning purposes.

A specific object of the invention is the provision of a removable desiccating unit in a coffee dispenser whereby the coffee can be maintained in a relatively dry atmosphere.

The novel features that are considered characteristic of the invention are set forth in the appended claims; the invention itself, however, both as to its organization and method of operation, together with additional objects and advantages thereof, will best be understood from the following description of the preferred embodiment when read in conjunction with the accompanying drawings, in which:

Figure 1:
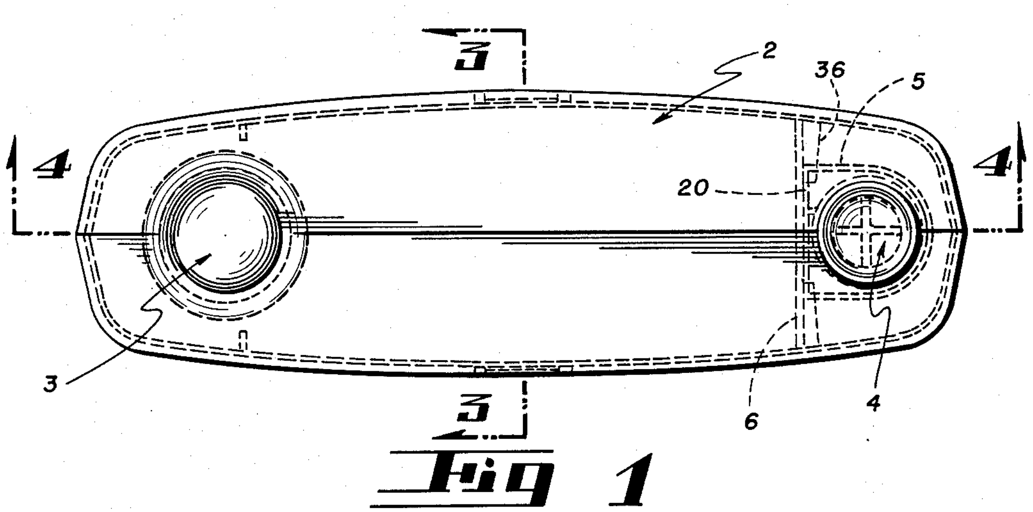
Figure 1 is a top plan view of the improved coffee container and dispenser.
Figure 2:
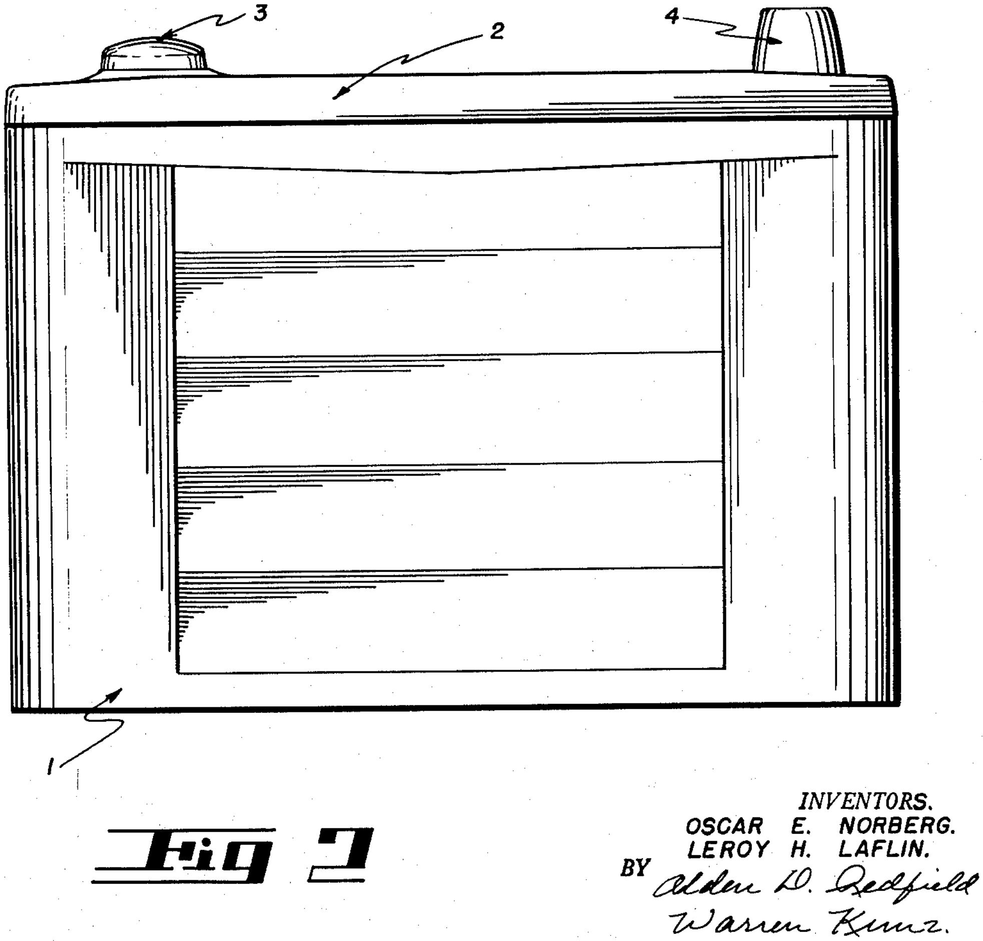
Figure 2 is a front elevational view of the structure shown in Figure 1.

In broad terms, the present invention comprises an elongated upright container, generally designated 1, having a closely fitted removable lid, generally designated 2. Coffee or similar products can be stored within the container, the internal atmosphere of which is kept dry by a desiccating unit, generally designated 3, which is removably secured to lid 2. Projecting above the lid is a button 4 which can be manually depressed to dispense and measure predetermined quantities of coffee from the container.

Button 4 is an integral part of a control plunger 5 which is slidably retained within one end of the container defined by the end wall of the container and by an upright transverse partition 6. Cooperatively disposed beneath the plunger is a discharge valve 7 which controls flow of coffee from a measuring cavity 8 to a coffee pot or other utensil.

During storage periods, the coffee is stored within the internal volume 9 of the container and is free to flow, particularly when the container is tilted, through port 10 into the measuring cavity 8. In this way, the measuring cavity may be completely filled with coffee but it will be understood that the coffee cannot come out of the dispenser until such time as discharge valve 7 is forced off of seat 11 in a manner to be described shortly.

Specific attention is now directed to the arrangement of plunger 5 and valve 7. It should be noted that valve 7 is removably secured, as by wing nut 12, to the lower end of an upright slidable rod 13 which is guided for vertical movement in a hole 14 formed in a horizontal partitioning wall 15. Valve 7 is maintained against seat 11 by means of a compression coil spring 16 which surrounds rod 13 and bears at its lower end against wall 15 and at its upper end against a cup 17 which is riveted and otherwise permanently secured to the upper end of rod 13.

Valve 7 cannot be forced off of seat 11 until sufficient pressure is applied to cup 17 to compress spring 16.

Figure 4:
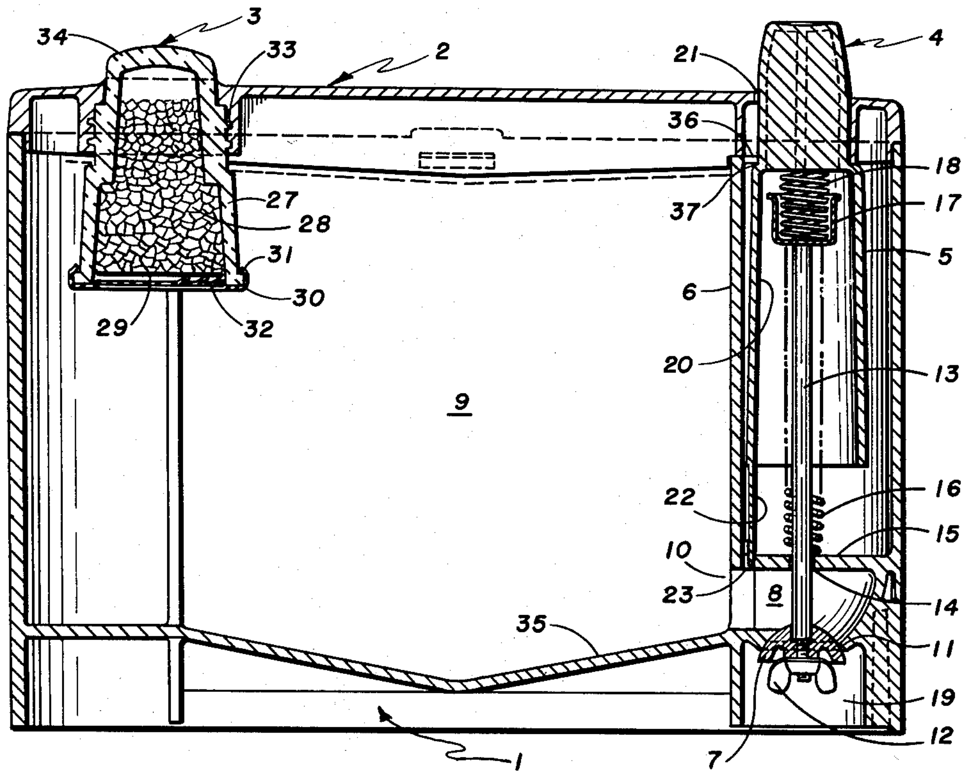
Figure 4 is a longitudinal sectional view taken on plane 4—4 of Figure 1 showing the structural details of the invention.

As illustrated in Figure 4, plunger 5 is hollow and surrounds the upper end of rod 13 and cup 17. Positioned between cup 17 and the underside of button 4 is a second compression type coil spring 18. Movement can only be transferred to rod 13 after spring 18 has been compressed sufficiently to permit the underside of button 4 to come into direct bearing contact with cup 17. Such operation is assured by making the load of spring 18, at the time of such engagement, smaller than that which is necessary to impart initial compression to spring 16.

A consideration of the structure disclosed to this point will make it apparent that by depressing button 4 plunger 5 is given an initial downward movement after which contact is made with cup 17 and movement imparted to rod 13 thereby forcing valve 7 off of its seat 11 to permit coffee to flow from the measuring cavity 8 to a discharge opening 19 formed in the bottom of the container.

Since plunger 5 must execute a predetermined initial movement before any movement is imparted to valve 7, it will be appreciated that small accidental movements imparted to the button will not cause coffee to flow from the container. This is an obvious benefit for a device which must be frequently handled in the course of its use.

Attention is now directed to Figure 1 which shows the outline of plunger 5 in plan view. It should be noted that the plunger includes a flat side 20 which is movably positioned closely adjacent to partition 6. Since the upper button 4 of the plunger is closely guided by an opening 21 formed in lid 2, rotation of the plunger is prevented by the proximity of flat side 20 to partition 6.

At the lower end of the plunger the flat side 20 is extended in the form of an integral, flat, rectangular gate 22 which is suitably proportioned to slide through a slot 23 formed in the horizontal partitioning wall 15. When button 4 is forced into the container, gate 22 is moved through slot 23 and across port 10 to prevent flow of coffee into the measuring cavity. The reason for providing springs 16 and 18 will now become apparent. It will be noted that an initial movement of plunger 5 must occur before valve 7 can be forced off of seat 11. During this initial movement, gate 22 substantially closes port 10 and prevents flow of coffee through the port and measuring cavity past seat 11.

Thus, in use, the container is first tilted to cause flow of coffee from volume 9 through port 10 into the measuring cavity. When the cavity has been filled, button 4 is depressed closing off port 10 and releasing a predetermined, measured quantity of coffee from the measuring cavity. As has been explained, this coffee flows past seat 11 and through the discharge opening 19.

Figure 3:
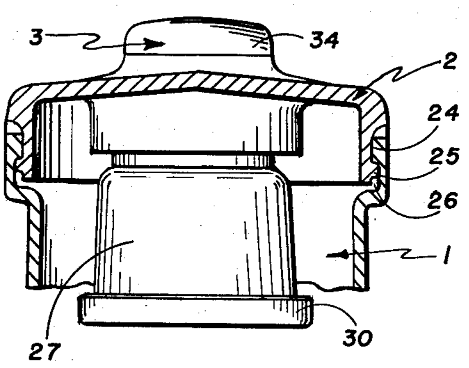
Figure 3 is a fragmentary cross sectional view taken on plane 3—3 of Figure 1.

Attention is now directed to Figure 3 which shows lid 2 closely fitted within the upper finish portion 24 of container 1. It is considered advisable, although not necessary, that projections 25 be provided on the exterior side walls of lid 2 to resiliently and releasably engage recesses 26 formed in the internal faces of the container. The snap engagement of projections 25 in recesses 26 removably retains the lid on the container and assures a relatively airtight fit.

The construction of the desiccating unit is well illustrated in Figure 4. It includes an inverted glass cup 27 containing a quantity of silica gel 28, which is kept within the inverted cup by an asbestos gasket 29 and a metallic retainer 30 which is bent into locked engagement with flange 31 at the lower end of the cup. A plurality of air holes 32 are formed in retainer 30 to permit circulation of air from the interior of the container into intimate contact with the silica gel.

Cup 27 is threadedly secured in lid 2 at 33, the upper end of the cup projecting visibly above the lid at 34. By saturating the silica gel with a dye, such as cobalt chloride, a characteristic indicating color can be imparted to it. Thus, using a dye of this type the silica gel will have a deep rich blue color when dry, and a pale pink color when it has become saturated with moisture. By noting the color, the user can determine that the desiccating unit is no longer effective and it can be readily removed from the lid and heated in an oven for approximately one-half hour at about 400° F. After such treatment, the moisture will have been driven from the silica gel and its blue color will have returned, indicating that the desiccating unit has been rejuvenated and is again ready for use in the container.

The container and plunger may be made from any suitable materials but preferably are made from plastics. By making container 1 from a transparent material, the user can readily determine visually the quantity of coffee stored within the container. In molding the container, the bottom wall 35 may be formed at an angle to favor ready flow of coffee from the container through port 10 when the container is tilted. Small retaining ears 36 can also be molded at the upper edge of partition 6 to engage shoulders 37 formed on plunger 5. These ears, in engagement with the shoulders, prevent the plunger from becoming disassembled from the container when lid 2 has been removed. Disassembly of the plunger, however, for cleaning purposes, can be readily accomplished by removing the lid and manually tilting the plunger toward the right (as viewed in Figure 4) until shoulders 37 are moved out of engagement with ears 36. The plunger 5 and spring 18 may then be lifted out of the container.

By removing wing nut 12, valve 7 can be removed from rod 13, and the rod and spring 16 removed through the top of the container.

From the foregoing description of the invention, it will be appreciated that there has been provided an improved means for storing, preserving, dispensing, and measuring coffee. The invention involves a relatively simple, economical, foolproof, and attractive structure. It is also to be noted that the formation of the container makes it convenient to store it in a refrigerator at low temperature. The dry atmosphere maintained within the container in combination with low prevailing temperatures enhances the quality, flavor, and aroma of the coffee and makes it possible to store it over relatively long time-periods.

Having described a preferred embodiment of our invention, we claim:

1. In a coffee preserving and dispensing apparatus, a container, a lid for said container, a desiccating unit secured to said lid in communication with the interior of said container, said container including a vertical partitioning wall defining a port near the bottom of said container, said container also defining a measuring cavity in communication with the port, a plunger slidably positioned adjacent said vertical partitioning wall in position to obstruct the port in the course of its movement, and normally closed valve means operated by said plunger in the course of its movements for discharging coffee from the measuring cavity.

2. In a coffee preserving and dispensing apparatus, an elongated upright open top container; a lid removably engaged with and closely fitted to the top of said container; an upright partitioning wall within said container including a port communicating with the interior of said container; said container defining a measuring cavity in communication with the port; a plunger slidably positioned adjacent said partitioning wall for movement to close the port; and normally closed valve means operated by movement of said plunger for releasing coffee from said measuring cavity.

3. In a coffee preserving and dispensing apparatus, an elongated upright open top container; a lid removably engaged with and closely fitted to the top of said container; a transparent desiccating unit removably engaged with said lid, said unit being visible from the exterior of said lid, said desiccating unit being in intimate communication with the interior of said container; an upright partitioning wall within said container including a port communicating with the interior of said container; a horizontal wall defining a measuring cavity within said container, said measuring cavity being in communication with the port; a plunger; a button at the upper end of said plunger; said lid defining an opening through which said button projects; said plunger having a flat side slidably positioned adjacent said upright partitioning wall; a gate at the lower end of said plunger, movement of said plunger carrying said gate into closed position relative to the port; a spring-loaded rod slidably supported by said horizontal wall, said rod being positioned beneath said plunger; a compression spring bearing on the upper end of said rod and against the underside of said button; and normally closed valve means associated with the lower end of said rod; downward movement of said plunger first closing the port and subsequently imparting movement to said rod for opening said valve means whereby coffee is released from the measuring cavity.

References Cited in the file of this patent

UNITED STATES PATENTS

| | | |
|---|---|---|
| 2,366,343 | Ludwig | Jan. 2, 1945 |
| 2,482,830 | Bannister | Dec. 27, 1949 |
| 2,548,168 | Luce | Apr. 10, 1951 |
| 2,571,083 | Wilt | Oct. 9, 1951 |
| 2,597,749 | Reilly | May 20, 1952 |
| 2,604,237 | Weddell et al. | July 22, 1952 |